United States Patent [19]
Sweeney et al.

[11] 3,887,611
[45] June 3, 1975

[54] PROCESS FOR CONVERTING ALKYL SULTONES TO ALKENE SULFONIC ACIDS

[75] Inventors: William A. Sweeney, Larkspur; Ralph House, San Pablo, both of Calif.

[73] Assignee: Chevron Research Company, San Francisco, Calif.

[22] Filed: Aug. 2, 1973

[21] Appl. No.: 384,862

Related U.S. Application Data

[60] Division of Ser. No. 215,191, Jan. 3, 1972, Pat. No. 3,845,114, which is a continuation-in-part of Ser. No. 33,948, May 1, 1970, abandoned.

[52] U.S. Cl. .......................... 260/513 R; 260/504 R
[51] Int. Cl. ........................................... C07c 143/16
[58] Field of Search ..................... 260/513 R, 504 R

[56] References Cited
UNITED STATES PATENTS

| | | | |
|---|---|---|---|
| 3,376,336 | 4/1968 | Stein et al. ...................... | 260/513 R |
| 3,423,453 | 1/1969 | Baumann et al. ............... | 260/513 R |

*Primary Examiner*—Leon Zitver
*Assistant Examiner*—Nicky Chan
*Attorney, Agent, or Firm*—G. F. Madgeburger; John Stoner, Jr.; J. Tedd Brooks

[57] ABSTRACT

Alkyl sultones are converted to alkene sulfonic acids by hydrolysis with a critical amount of water (i.e., 5 to 35 percent) optionally followed by dehydration and rehydrolysis, each step increasing the yield of alkene sulfonic acids.

7 Claims, No Drawings

PROCESS FOR CONVERTING ALKYL SULTONES TO ALKENE SULFONIC ACIDS

CROSS-REFERENCE TO RELATED APPLICATION

This is a division of application Ser. No. 215,191, filed Jan. 3, 1972, now U.S. Pat. No. 3,845,114, which is a continuation-in-part of application Ser. No. 33,948, filed May 1, 1970, now abandoned.

BACKGROUND OF THE INVENTION

1. Field of the Invention

The present invention is concerned with the field of synthetic detergent compositions, and more particularly with a process for preparing mixtures of olefin sulfonates containing major amounts of alkene sulfonates.

2. Description of the Prior Art

Olefin sulfonates are primarily produced by sulfonation of olefins with sulfur trioxide. However, this method of sulfonation followed by hydrolysis and neutralization of the product produces a mixture containing approximately 50 percent by weight each of hydroxy alkane sulfonates and alkene sulfonates. The importance of high alkene sulfonate contents in olefin sulfonate detergents is known in the art.

Several processes have been proposed for obtaining high concentrations of alkene sulfonates from the reaction of an olefin and $SO_3$. In one process, the sulfonation step is modified by complexing the $SO_3$ with a moderator such as dioxane (J. Am. Oil Chem. Soc., 42, 873 (1965)) or trialkylphosphate (Ind. & Eng. Chem., Prod. Res. and Dev., 2, 229 (1963)). These processes suffer from the drawback of having a moderator present which must be recovered and recycled for economic operation.

Another process which has been proposed for obtaining an increased recovery of alkene sulfonic acid involves modification of the hydrolysis step. For example, Canadian Patent 775,589 teaches the hydrolysis of the olefin-$SO_3$ reaction product with an alkoxide. A disadvantage of this method is that the alkoxides are expensive.

In the sulfonate surfactant field, significant commercial activity centers around the production and shipment of alkylaryl sulfonic acids. The sulfonate producers thus can make a single, liquid product which is inexpensive to ship because it is not diluted by water, which is normally present after a neutralization step. However, it also allows the customer latitude either to use the acids directly in certain applications or to neutralize them with a variety of bases.

Olefin sulfonates are not generally known in the anhydrous acid form. The usual direct sulfonation product contains a large proportion of sultone which is inactive in either the acid or neutralized form. The presence of sultones also makes the product solid at room temperatuare. Hydrolysis of the sulfonation product after water addition and before neutralization is known in the art; however, the amount of water which is taught to be added (two parts of one part of sulfonate) is undesirably high for subsequent shipping, or for use in non-aqueous systems.

SUMMARY OF THE INVENTION

A novel process for the hydrolysis of alkyl sultones is provided. In this process the sultones containing from 10 to 24 carbon atoms are hydrolyzed in the presence of a certain minor but critical amount of water (i.e. 5 to 35 percent) to obtain a useful mixture of alkene sulfonic acids and hydroxyalkane sulfonic acids.

In a particularly useful embodiment of the invention the alkyl sultones are present in a reaction mixture along with alkene sulfonic acid and other materials in an olefin sulfonate mixture which is commonly derived by the reaction of $SO_3$ with suitable olefins. Subsequent dehydration of the hydrolysis product will convert the hydroxyalkane sulfonic acid to alkyl sultones. Each repetition of the hydrolysis and dehydration steps reduces the alkyl sultone content of the mixture by about 50 percent and thus increases the alkene sulfonic acid content by a corresponding amount. The procedure can be repeated until the desired level of alkene sulfonic acid is obtained. After the desired level of alkene sulfonic acid content is obtained, the final product mixture may be directly used in commerce or may be saponified with a base to produce the sulfonate salts suitable for use in detergent compositions.

DETAILED DESCRIPTION OF THE INVENTION

Olefins suitable for conversion to sulfonic acids in accordance with the present invention include straight-chain alpha olefins from wax cracking, straight-chain alpha olefins produced by Ziegler polymerization of ethylene, straight-chain internal olefins prepared by catalytic dehydrogenation of normal paraffins, and straight-chain internal olefins prepared by chlorination-dehydrochlorination of normal paraffins. The olefins may contain from 10 to 24 carbon atoms, usually 13 to 22 carbon atoms, and preferably 14 to 20 carbon atoms per molecule.

In addition, the process of the present invention may be practiced on alkyl sultones, wherein the hydrocarbon portion of the molecule contains from 10 to 24 carbon atoms, usually 13 to 22 carbon atoms, and preferably 14 to 20 carbon atoms per molecule. U.S. Pat. Nos. 3,164,608 and 3,164,609 describe processes for obtaining sultones from olefins by reaction with $SO_3$ and subsequent distillation or filtration. The sultones formed as a result of an $SO_3$:olefin reaction may also be separated from a cold neutralized product by extraction. These techniques and procedures are known in the art.

In a preferred embodiment, however, the process of the present invention is conducted on sulfonated olefins containing alkyl sultones and alkene sulfonic acids as the major components as well as a lesser proportion of disulfonated product. When olefins are sulfonated in accordance with the method as described below, the sulfonated product, commonly called olefin sulfonate, usually contains from about 20 to 60 percent by weight of alkene sulfonic acid and from about 80 to 40 percent of alkyl sultone; normally, the original sulfonation product will contain from 30 to 40 percent alkene sulfonic acid.

The amount of $SO_3$ utilized in the sulfonation of the olefins may be varied but is usually within the range of 0.95 to 1.25 mols of $SO_3$ per mol of olefin and preferably in the range 1:1 to 1.2:1. Greater formation of disulfonated products is observed at higher $SO_3$:olefin ratios. Disulfonation may be reduced by carrying the sulfonation reaction only to partial conversion of the olefin — for example, by using $SO_3$:olefin ratios of one or less and removing the unreacted olefin by a deoiling or vaporization process.

In order to obtain a product of good quality, the $SO_3$ employed in the sulfonation reaction is generally mixed with an inert diluent or with a modifying agent. Inert diluents which are satisfactory for this purpose include air, nitrogen, $SO_2$, dichloromethane, etc. The volume ratio of $SO_3$ to diluent is usually within the range of 1:100 to 1:1. In some cases, the reaction of olefin with $SO_3$ can be carried out under subatmospheric pressure without a diluent. Modifying agents sometimes employed with $SO_3$ include dioxane, trialkyl phosphates, etc.

Hydrolysis as used herein is contemplated to mean the cleavage of the sultone ring to give a mixture of alkene sulfonic acid and hydroxyalkane sulfonic acid. In the situation wherein the sultones are obtained in an olefin sulfonation mixture, then after sulfonation, the sulfonated olefins are treated with water in a sufficient amount to hydrolyze the major portion of the sultone present. In general, on a weight basis, it has been found desirable to use from 5 to 25 percent, and preferably 10 to 20 percent of water based on the weight of sultone, although in the interests of complete hydrolysis somewhat larger amounts up to about 35 percent may be used. The use of too little water during hydrolysis results in oligomerization and a subsequent loss in yield of alkene sulfonic acids.

On the other hand, hydrolysis can be effected with much larger amounts of water present than those specified above, but an undesirable product is formed. If the hydrolyzed acid is to be used directly in commerce, it is expensive to ship the dilute acid. If attempts are made to dehydrate it according to the procedures of this invention, the product will form an intractable gel.

Additionally, there is a surprising increase in solubility of the sodium sulfonate salts of acids obtained by the hydrolysis procedure described herein as compared with conventional products.

The hydrolysis reaction is conducted at temperatures sufficient to cause the reaction of water and sultone — for example, in the range of from 100° to 200°C and preferably 140° to 170°C. In general, the reaction time required is from about one-half hour to 20 hours and preferably 2 to 8 hours. At higher temperatures of reaction, generally shorter times are necessary.

The time required for hydrolysis in this process is longer than that required in the known processes for hydrolyzing a 20 to 50 percent aqueous sulfonate solution by either acidic or basic catalysis. Apparently different chemical steps are involved, leading to a different product. In the present process it is believed that the sultones isomerize before opening thereby giving a product containing mostly 4-hydroxyalkane sulfonate and very little of the normal 3-hydroxyalkane sulfonates.

If the repetitive process is used to increase the alkene sulfonic acid content, all of the sultones need not be hydrolyzed during any given hydrolysis step, but rather only the major portion need be reacted since after several cycles essentially all of the sultones will have been converted to alkene sulfonic acids.

The extent of the hydrolysis reaction can be followed by several different analytical techniques. One method is the cold titration with caustic. That is, an acid number is determined by titration of a portion of the original feed, and, as the reaction proceeds, titrations are made on small aliquots until there is little or no change in acid number with increasing hydrolysis time.

During both the hydrolysis and dehydration steps (see below), the NMR spectrum should be run when the water content is lower than about 10 percent to ensure that the oligomerization reaction as described in copending application U.S. Ser. No. 858,097 is not occurring. In some cases it may be advantageous to obtain a mixed product from both hydrolysis and dimerization.

Dehydration in the present context includes both removal of unbound water (drying) and the chemical loss of water from a hydroxy sulfonic acid to form sultone. The latter step will not occur until the former is substantially complete, and therefore criticality of the dehydration step primarily involves processing during the final stages of dehydration. Conditions specified for dehydration, then, apply to the second stage when the water content has been reduced below about 5 percent.

Dehydration of the hydrolyzed sulfonated olefins may be accomplished by several different methods. Surprisingly, dehydration of the hydrolyzed mixture only slightly affects the alkene sulfonic acids present. That is, dehydration converts the major portion of the hydroxyalkane sulfonic acid to alkyl sultones with little or no loss of alkene sulfonic acid content.

Examples of the dehydration methods include: heating at temperatures above 100°C, heating at temperatures below 100°C under subatmospheric pressure or with an inert gas sweep, and by adding an azeotropic agent and distilling out an aqueous azeotrope. Suitable azeotropic agents include but are not limited to benzene and xylene.

During dehydration, it is necessary that the time-temperature history be mild enough to prevent dimerization. (See copending application Ser. No. 858,097.) For example, at 100°C up to 1 to 2 hours reaction time may be employed without unsuitable dimerization occurring, whereas at 130°C only a few minutes of heating can be employed for dehydration without dimerization. The pressure on the system during the dehydration step is usually 1½ atmospheres or less. It is preferred that the temperature be maintained below 100°C with subatmospheric pressure. For example, 60°-80°C is a most preferable range. It has been found that most satisfactory results are obtained by operating at pressures below 100 mm of mercury and preferably below 200 mm of mercury.

The dehydration step will require heating the hydroxyalkane sulfonic acid-containing mixture for a period of time necessary to remove essentially all of the water previously added. This will usually require from about 0.05 to 10 hours and more preferably from about 0.1 to 2 hours. Preferred times are 0.2 to 1.0 hours. The step of dehydration can be followed by measuring the amount of water distilled off the reaction product, or it may be followed by cold caustic titration of the reaction mixture. When the second method is used, heating of the reaction mixture is continued until the acid number shows little or no decrease with increasing time. At this time, a major portion of the hydroxyalkane sulfonic acid will have been reconverted to sultone. At the same time NMR spectra may be obtained to ensure that dimerization is not occurring.

The hydrolysis and dehydration steps may then be repeated as often as required to give as a final product, alkene sulfonic acid essentially free of hydroxyalkane sulfonic acid. In general, three or more cycles are required. For example, three cycles on a typical air-$SO_3$- alpha olefin reaction product would yield a product containing from about 90 to 95 percent by weight of alkene sulfonic acid.

If the final product is to be a sulfonic acid-water mixture, the last process step will be hydrolysis as described above. If the final product is to be a neutralized salt, the hydrolyzed acid mixture will be neutralized in the usual manner with alkali or alkaline earth oxides, hydroxides, carbonates, etc., or with ammonia or organic amines. Alternatively, the final sultone hydrolysis step may be included in or subsequently to the neutralization. This will convert the small amount of sultone remaining into the salt of mixed sulfonic acids. This can be done, for example, by heating the final reaction mixture with caustic within the range of 80°–200°C for periods of from a few minutes up to about an hour. As the temperature increases, the time necessary for final hydrolysis decreases. At about 150°C, times within the range of 0.1 to 0.5 hours were found sufficient.

The neutralized alkene sulfonate surface-active material may be recovered from the product obtained as described above by drying as in a spray drier, or in a drum drier, or it may be used as a concentrated aqueous solution. The dried material is usually combined with various builders, well known in the detergent art, to give a heavy-duty detergent formulation. These builders include, among others, sodium phosphate, sodium silicate, sodium sulfate, and carboxymethylcellulose. The products of the present invention are particularly useful in liquid detergents. For this use, the aqueous solution may be mixed with other surface-active materials, such as linear alkylbenzene sulfonates, alcohol sulfates, and alcohol ethoxy sulfates. Hydrotropic agents, such as xylene sulfonate, or solvents may also be added to improve the clear point of the resulting liquid formulation.

In general, additional compatible ingredients may be incorporated into the compositions of the present invention when used as detergents to enhance their detergent properties. Such ingredients may include, but are not limited to, anti-corrosion, anti-redeposition, bleaching and sequestering agents, optical whiteners and certain organic and inorganic alkali and alkaline earth salts, such as phosphates, inorganic sulfates, carbonates, or borates, and the organic salts of the amino polycarboxylic acids, e.g. trisodium salt of nitrilo triacetic acid, tetrasodium salt of ethylenediamine tetraacetic acid, etc.

The following examples illustrate the application of the process of this invention to provide olefin sulfonate mixtures in the acid form containing a minor amount of water and further processing to obtain mixtures containing a maximum amount of alkene sulfonate.

EXAMPLE 1

Sulfonation of 1-hexadecene

The sulfonation unit which was employed consisted of a 5 mm I.D. 3-foot, jacketed falling film reactor equipped with an inlet weir for the olefin feed, a central 3 mm O.D. sulfur trioxide-air inlet tube, followed by a 1⅜ × 4 inch post reactor tube. The reactor was continuously charged with 1-hexadecene at a rate of 4.36 grams per minute. Simultaneously there was added 1.87 grams per minute of $SO_3$ diluted to 5 percent by weight in air. The temperature of the outer surface of the reactor wall was maintained in the range of 45°–65°C by circulating cooling water in the jacket. The sulfonation product was cooled and chilled to 0°C over a period of 2 hours. The product weighed 739 grams.

A 10-gram portion of the acid/sultone product was analyzed by cold neutralization (room temperature) with 1.3 mmoles/gram of NaOH in aqueous alcohol followed by complete hydrolysis and neutralization at 95°C. This analysis showed the initial presence of 34 percent sulfonic acid and 66 percent sultones. The sodium salt obtained was de-oiled by three extractions with petroleum ether from a 75 percent alcohol solution to obtain about 0.5 percent by weight oil. This indicates that both the original sulfonation and the hydrolysis steps were substantially complete.

An IR spectrum of the reaction product showed the presence of both sultone and sulfonic acid.

An NMR spectrum showed similar evidence of the mixture of sultones and unsaturated sulfonic acid.

EXAMPLE 2

Hydrolysis of 1-hexadecene-$SO_3$ Reaction Product a. With a limited amount of water The unneutralized reaction product of Example 1, 50 grams, and 10 grams of water was placed in a Fischer-Porter bottle equipped with a magnetic stirrer. The mixture was heated to 150°C and stirred at this temperature for 6 hours.

At the end of this time both IR and NMR spectra showed that most of the sultone had been hydrolyzed. The IR spectrum showed the unsaturated sulfonic acid peaks at 1700, 1165, 1040, 965, and 910 $cm^{-1}$. No appreciable sultone bands at 1330–1360, 940, 895, or 810–880 were found. The NMR spectrum showed a large peak at 5.2–5.4 ppm for vinyl protons, a small peak at 4.4–4.7 ppm representing about 9 percent sultone, and a peak at 3.4–3.8 ppm for the carbinol proton of hyroxyalkane sulfonic acid. The NMR ratio of second functionality to sulfonic groups, determined from the expression, $$\frac{(\text{area at } 3.4-3.7 \text{ ppm} + \text{area at } 4.4-4.6 \text{ ppm}) + \text{area at } 5.2-5.6 \text{ ppm}}{\text{area at } 2.6-3.3 \text{ ppm}}$$

is 1.2 for this product.

Most of this acidic product, 52.8 grams, was dissolved and neutralized with NaOH in 70 percent aqueous ethanol. An insoluble salt (1.24 grams, 2.7 percent of active) was removed by filtration, and an oil (3.01 grams, 6.8 percent of active, identified as a 1,4-sultone by IR spectrum) was recovered by five extractions with petroleum ether followed by evaporation of the ether. The neutralization equivalent of this material was 3.08 mmoles/gram, as is, or 3.6 on a dry basis. The desalted, de-oiled active was dried to a free-flowing powder containing 1.4 percent by weight water. The IR spectrum was the same as the sulfonate salt of Example 1 except for a larger 965 $cm^{-1}$ band (from trans internal double bonds) and a broad hydroxyl band centering at 3450 $cm^{-1}$.

The sodium sulfonate salt was titrated with a standardized solution of cationic agent (Hyamine 1622) to give an equivalent weight of 334. Analysis for alkene sulfonate content by analytical hydrogenation showed it to be 67 percent alkene sulfonate.

From these analyses it was concluded that the original hydrolyzed acid contained about 8 percent sultone, 62 percent alkene sulfonic acid, 28 percent sulfonic acid, and 2 percent inorganic acids.

b. With an intermediate amount of water

The acid product of Example 1, 30 grams, was heated as in Example 2a with 15 grams of water at 160°C for 6 hours. During this time the mixture remained in a gelled condition even at the high temperature. Consequently, little or no stirring was accomplished. An IR spectrum of the product indicated that hydrolysis had occurred, but practical separation of the acid from the gel was impossible.

c. With a large amount of water 2b was repeated except that 20 grams of acid product and 40 grams of water were heated at 150°C for 1 hour. The IR spectrum showed that hydrolysis was complete. The material was neutralized with NaOH (requiring 3.9 mmoles/gram on a dry basis). The sodium sulfonate was desalted (removing 0.5 percent of insoluble material), de-oiled (removing 1.9 percent oil), and dried to 1 percent water content. The IR spectrum of the material was quite similar to that of Example 2a except that the hydroxyl band was broader and centered at 3400 $cm^{-1}$. This example shows that hydrolysis occurs much faster when a large amount of water is present.

EXAMPLE 3

Oligomerization of the Hexadecene-$SO_3$ Reaction Product

The acid reaction product from Example 1, 50 grams, was heated in a round bottomed flask at 150°–153°C for 2¼ hours. At the end of this time, the viscosity of the heated material was considerably greater than that of the starting material.

An infrared spectrum showed strong adsorptions at 1700, 1165, 1040, 910 $cm^{-1}$, all of which are typical of aliphatic sulfonic acids. The absence of adsorption bands at 1330–1360, 895 and 810–880 $cm^{-1}$ showed that the sultone originally present in the feed stock had all been converted. The absence of a 965 $cm^{-1}$ adsorption band showed that there were no 1,2-disubstituted double bonds, i.e., all alkene-sulfonic acid was converted.

A nuclear magnetic resonance (NMR) spectrum had adsorption at 2.9–3.2 ppm, typical of aliphatic sulfonic acids. The absence of any bonds at 4.4–4.6 ppm and at 5.0–5.9 ppm also indicated complete conversion of the sultone and the absence of any 1,2-disubstituted double bonds, respectively.

A neutralization equivalent analysis required 0.0032 mols of base per gram of product.

The product was shown to have 2.3 percent water by a Karl Fisher titration.

The remainder of the product was converted to the sodium salt and was then desalted by precipitation from 70 percent aqueous ethanol and deoiled by five extractions of this solution with petroleum ether. The precipitate was analyzed for $Na_2SO_4$ and the extract was concentrated. This procedure showed the presence of 1.5 percent (wt.) oil and 0.4 percent sodium sulfate in the reaction mixture. The IR spectrum of the sulfonate salt was typical of the IR spectrum of olefin sulfonate salts, except there was no adsorption at 965 $cm^{-1}$, i.e., there were no double bonds of the transconfiguration.

This example shows that heating the sulfonate reaction product in the absence of added water leads to a substantially different product as described in copending application Ser. No. 858,097.

EXAMPLE 4

Hydrolysis of $SO_3$ Reaction Product Obtained by Low Conversion of 1-Hexadecene Reaction product of 1-hexadecene and $SO_3$ was obtained in the same way as in Example 1 except that the olefin was pumped at the rate of 4.37 g/min. and the $SO_3$ at 1.20 g/min. or approximately 0.8 moles $SO_3$ per mole of olefin. This reaction product (30 g.) was hydrolyzed with 6 g. of water as in Example 2a at 160°C for 6 hours. Good stirring was obtained throughout.

The infrared spectrum was practically identical to the product of Example 2a showing hydrolysis to be substantially complete.

EXAMPLE 5

Hydrolysis of Pure Sultone

Hexadecyl sultone (10 g.), recrystallized twice and containing about 70 percent of the 1,3-isomer and 30 percent of the 1,4-isomer was hydrolyzed as in Example 2a with 2 g. water at 160°C for 6 hours. It remained fluid throughout the hydrolysis and at the end had an infrared spectrum equal to that of Example 2a.

EXAMPLE 6

Viscosity of Sulfonate-Water Mixtures

Various mixtures (2.5 g.) of the acidic sulfonation product of Example 1 with water were placed in 5 ml. sealed glass ampoules with a small stainless steel ball and heated over a number of hours from 60°C to 170°C. Visual observation of viscosity was as follows:

| Water Content, % | Viscosity at 170°C |
|---|---|
| 5 | Fluid |
| 10 | Fluid |
| 20 | Slightly Fluid |
| 30 | Gelled |
| 50 | Fluid |

EXAMPLE 7

Solubility of Sodium Sulfonates

Clear solution temperatures of the desalted, deoiled sulfonates of Examples 2a and 2c were determined for 25 percent solutions in distilled water as follows:

Low water product of Example 2a — 41°C
High water product of Example 2c — 45°C

EXAMPLE 8

Conversion of the Hydrolyzed Sulfonate to a Methyl Ester

The hydrolysis product of Example 2a (2.13 g.) was dissolved in 250 ml. of diethyl ether. Then diazomethane formed by the base-catalyzed decomposition of N-methyl-N-nitroso-p-toluenesulfonamied [Reference: Rec. Tran. Chim. 73, 229 (1954)] was bubbled into the either solution until the solution had a persistent yellow color. The ether was removed to yield 1.85 g. of yellow oil whose infrared spectrum showed peaks at 1360, 1170 and 995 $cm^{-1}$, all of which are characteristic of methyl aliphatic sulfonate esters, plus a small band at 900 $cm^{-1}$ from the 7 percent 1,4-sultone remaining and a small band at 3560 $cm^{-1}$ from the hydroxyalkane sulfonate.

EXAMPLE 9

Drying the Hydrolyzed Sulfonate

The hydrolyzed product of Example 2a (32.9 g.) was heated under vacuum with a nitrogen sweep in a rotary evaporation placed in a water bath at 40°C until the remaining product weighed 27.3 g. Typical changes occurred in the infrared spectrum associated with loss of water from an aliphatic sulfonic acid; namely, decrease in the broad absorptions at 3200–3500 cm$^{-1}$ and 1120–1230 cm$^{-1}$ and increase in the ratio of peaks at 900 and 1040 cm$^{-1}$. However, there was no indication of sultone formation (no absorption at 1350 and 825 cm$^{-1}$) and the neutralization equivalent did not change. A similar experiment was made in the same way but with several 50 ml portions of benzene being added to help remove the water by azeotrope formation. The same result was obtained.

EXAMPLE 10

Dehydration of Hydrolyzed Sulfonate

Portions of the dried product of Example 9 were heated and neutralization equivalents obtained as follows:

| Heating | Neutralization Equivalent |
| --- | --- |
| Ex. 10a 80°C, 30 min. | 2.02 mEq./g. |
| Ex. 10b 100°C, 15 min. | 2.14 mEq./g. |
| Ex. 10c 100°C, 60 min. | 2.30 mEq./g. |

These neutralization equivalents correspond to the formation of about 40 percent sultone compared with the original sultone content in Example 1 of 66 percent. The higher neutralization equivalent obtained at the higher temperature and longer time is evidence of some oligomerization occurring.

Infrared spectra of these samples all showed considerable 1,4-sultone formation as evidenced by peaks at 900, 825 and 530 cm$^{-1}$. No 1,3-sultone was observed. The trans internal olefin peak at 965 cm$^{-1}$ was still present. Analysis of the infrared spectrum of the methyl esters of these products (prepared as in Example 8) confirmed the presence of about 40 percent 1,4-sultone and showed that no hydroxyalkane methyl sulfonate was present.

EXAMPLE 11

Rehydrolysis of Dehydration Product

Dehydration product (12.1 g.), prepared as in Example 10c, plus 2.41 g. water was heated at 160°C for 6 hours. Infrared analysis showed that hydrolysis of the 1,4-sultone originally present giving 4-hydroxy-1-sulfonate was substantially complete. The amount of 4-hydroxyalkane sulfonate present was shown to be 21 percent by subsequently passing the material through the drying and dehydrating steps of Examples 9 and 10c using the loss in neutralization equivalent and infrared of the methyl ester as analytical tools.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

What is claimed is:

1. A process for maximizing the alkene sulfonic acid content of a straight chain 10 to 24 carbon sulfonated olefin which comprises the steps of
   a. hydrolyzing the alkyl sultone present in the sulfonated olefin to alkenesulfonic acid and hydroxyalkanesulfonic acid by contacting the sulfonated olefin with from 5 to 25 percent of water relative to the weight of the alkyl sultone at a temperature of from 100° to 200°C for a period of from about one-half hour to about 20 hours, and
   b. dehydrating the product of (a) to convert the hydroxyalkanesulfonic acid produced in (a) by heating the product and distilling off the water produced by the resulting dehydration of the hydroxyalkyl sulfonic acid to alkyl sultone, and
   c. hydrolyzing again as in (a).

2. Process according to claim 1 wherein steps (b) and (c) are repeated at least one additional time.

3. The process of claim 2 wherein in (a) the water is employed in an amount of from 10 to 20 percent by weight relative to the alkyl sultone.

4. The process of claim 1 in which the temperature is from 140° to 170°C.

5. The process of claim 1 in which the sulfonated olefin contains from 13 to 22 carbon atoms.

6. The process of claim 1 in which the water is removed by distillation of a suitable azeotrope.

7. A process for maximizing the alkene sulfonic acid content of a sulfonated olefin of 10 to 24 carbon atoms which comprises alternate repetition of steps (b) and (c) of claim 1 until at the final completion of step (c) the product is essentially free of hydroxyalkane sulfonic acid.

* * * * *

UNITED STATES PATENT AND TRADEMARK OFFICE
CERTIFICATE OF CORRECTION

PATENT NO. : 3,887,611
DATED : June 3, 1975
INVENTOR(S) : William A. Sweeney and Ralph House It is certified that error appears in the above-identified patent and that said Letters Patent are hereby corrected as shown below:

Col. 1, line 59, "of one" should read --to one--.

Col. 7, line 1, after "percent" (second occurrence) insert --hydroxyalkane--.

Col. 8, line 60, "either" should read --ether--.

Col. 10, line 36 (Claim 3), "claim 2" should read --claim 1--.

Signed and Sealed this fourteenth Day of October 1975

[SEAL]

Attest:

RUTH C. MASON
Attesting Officer

C. MARSHALL DANN
Commissioner of Patents and Trademarks